United States Patent Office 3,585,259
Patented June 15, 1971

3,585,259
PROCESS FOR MANUFACTURING FRIABLE SOLID POLYESTER PRODUCTS
Edwin B. Lefferts and Kenneth T. Barkey, Rochester, N.Y., assignors to Eastman Kodak Company, Rochester, N.Y.
No Drawing. Continuation-in-part of application Ser. No. 777,489, Nov. 20, 1968, which is a continuation-in-part of abandoned application Ser. No. 578,139, Sept. 9, 1966. This application Aug. 15, 1969, Ser. No. 850,661
Int. Cl. B29d 27/04; C08g 17/003, 53/08
U.S. Cl. 264—50                                        4 Claims

ABSTRACT OF THE DISCLOSURE

It has been found that by (a) incorporating an inert gas into molten polyester prepolymer prior to the time the prepolymer is solidified (after which it is to be ground and subjected to a further polymerization step via a solid state reaction) and (b) maintaining the gas dispersed through the prepolymer as it is solidified, makes it possible to economically grind solidified prepolymeric material having significantly higher intrinsic viscosities than was heretofore believed possible. The use of prepolymer having higher I.V.'s simplifies the subsequent polymerization step.

---

This application is a continuation-in-part of U.S. patent application Ser. No. 777,489, filed Nov. 20, 1968, now abondoned which in turn was a continuation-in-part of U.S. patent application Ser. No. 578,139, filed Sept. 9, 1966, and now abondoned.

This invention relates in general to the preparation of linear ployester polymers and, in particular, to a method for treating such polymers in a manner designed to make them easily grindable. Specifically, the invention relates to the preparation of linear superpolyesters of glycols and dibasic acids, such polyesters having a molecular weight of at least about 15,000 and ranging upward to 100,000 or more and having an intrinsic viscosity above about 0.50.

The preparation of polyesters by esterification or ester exchange and condensation is well known. In the case of poly(ethylene terephthalate), for example, it is customary to react dimethyl terephthalate with ethylene glycol in the presence of a suitable catalyst to form a low molecular weight polymer, sometimes called "monomer," and by-product methanol. After the methanol is nearly completely removed, the reaction temperature is raised and the "monomer" is heated under lower pressure to obtain a prepolymer of intermediate molecular weight and to remove the remaining ethylene glycol. The reaction is then continued until a polyester of the desired molecular weight is obtained. The molecular weight of the product may be high enough that the polyester can be used for forming films and fibers. Such a system, whether batch or continuous, is known as a melt polymerization process. In accordance with such process, the polymerization can be continued until a polyester of the desired melt viscosity or polymer molecular weight is obtained or the melt process may be stopped at some intermediate point to obtain a prepolymer as described above, i.e. a polymer having a molecular weight of from about 2,000 to about 10,000 and having an intrinsic viscosity, for poly(ethylene terephthalate), for example, of from about 0.1 to about 0.50. This material can be stored and subsequently polymerized by remelting and continuation of the melt process or, more advantageously, it may be ground and subjected to solid phase polymerization at a temperature considerably below its melting point, either with a gas (or liquid) stream at atmospheric pressure or at reduced pressure and either by batch or continuous processes.

In the solid phase polymerization (i.e. powder polymerization process), the intrinsic viscosity of the prepolymer is one important factor that governs the time necessary to polymerize the powder to a practical and useful molecular weight. For example, poly(ethylene terephthalate) prepolymer, catalyzed with a zinc-antimony catalyst, can be polymerized to a practical intrinsic viscosity of 0.70 to 0.71 or more. The reaction time depends to a great extent on the initial intrinsic viscosity of the prepolymer, other factors being equal:

| Prepolymer intrinsic viscosity: | Hours reaction to give product of I.V. of 0.70 |
|---|---|
| 0.30 | 10 |
| 0.34 | 5 |
| 0.38 | 3 |
| 0.42 | 2 |
| 0.50 | 1 |

It is obvious, therefore, that greatly reduced solid phase reaction times would result if a way could be found to rapidly and economically grind prepolymer of relatively high intrinsic viscosity.

Unfortunately, it becomes increasingly difficult to grind prepolymer as the intrinsic viscosity approaches that of the final polymer. For poly(ethylene terephthalate) an intrinsic viscosity of about 0.40 is usually considered optimum for the conventional powder polymerization process. At higher I.V. value the polyester has physical strength properties approaching those of the product and, as a result, grinding rates decrease and wear on grinding equipment increases markedly. In addition, as the I.V. increases, greater heat from the grinding operation is observed and increased color and greater carboxyl contents in the prepolymer are found. At the higher temperature in the grinder, the impact strength of the polyester is increased, thus also slowing down the grinding rate. In addition, smaller size screens are required as the I.V. is increased to give the same particle size distribution. These factors reduce the grinding rate to an impractical value.

Accordingly, the principal object of this invention is to provide a method for treating a polyester prepolymer melt so as to increase the friability of the melt when solidified, i.e. to increase the amenability of same to grinding.

A further object of this invention is to provide a novel method for increasing the ease with which a solidified polyester prepolymer may be ground.

Another object of this invention is to provide an easily grindable polyester prepolymer having an intrinsic viscosity as high as 0.60 or more.

Still another object of this invention is to provide a novel method for preparing superpolyesters wherein a desired ultimate intrinsic viscosity may be attained in a shorter time than was possible heretofore.

The above objects, and other objects which will become apparent to those skilled in the art, are attained by the method of this invention which, briefly, comprises incorporating into a polyester prepolymer melt, an inert gas, and then solidifying the melt so that a relatively large amount of gas is trapped in the resulting solid polymeric material in the form of many discrete gas bubbles.

The polyester prepolymers which are preferably treated in accordance with this invention have an intrinsic viscosity of from about 0.4 to about 0.60 and are prepared by an ester interchange reaction involving at least one glycol with at least one diester of a dibasic acid comprising at least 50 mole percent of an acid having two carboxyl radicals attached to a carbocyclic nucleus having from 4 to 6 carbon atoms per ring followed by a heat treatment (melt) step.

Illustrative dibasic acids which may be used include terephthalic acid, trans-hexahydroterephthalic acid, p,p'-sulfonyldibenzoic acid, 4,4'-diphenic acid, 4,4'-benzophenonedicarboxylic acid, 1,2 - di(p-carboxyphenyl) ethane, 1,2-di(p-carboxyphenoxy)ethane, 4,4'-dicarboxydiphenyl ether, etc. Fused rings can also be present such as in 2,7- 1,4- or 1,5-naphthalenedicarboxylic acid. The acids are preferably those containing a trans-cyclohexane nucleous or an aromatic nucleus containing from one to two benzene rings of which at least one has the usual benzenoid unsaturation. Of course either fused or attached rings can be present. All of the compounds named in this paragraph come with the scope of this preferred group.

Examples of other bifunctional dicarboxylic organic acids which are adapted to the formation of linear polyesters and which can be employed in accordance with this invention as described above include oxalic acid, carbonic acid, succinic acid, adipic acid, sebacic acid, azelaic, acid α,α-diethyladipic acid, dimethyl-malonic acid, dicarboxyl diethyl ether, isophthalic acid, orthophthalic acid, hexahydro-ortho-phthalic acid, etc. Carbonic acid is an obvious equivalent included among these other acids.

In addition to mixtures of dicarboxylic organic acids, the polyesters defined in this invention can also be modified by the employment of hydroxy acids such as hydroxypivalic acid, hydroxybutyric acid, hydroxycaprioic acid, p-hydroxybenzoic acid, etc.

Glycols which may be condensed with the diesters derived from the acids set forth above include, for example, ethylene glycol, 1,3-propanediol, 1,4-butanediol, 2,2-dimethyl - 1,3 - propanediol, 1,4-cyclohexanedimethanol and the like.

The catalysts which may be used in the preparation of polyesters, such as described above, include organic and inorganic compounds of metals such as titanium, manganese antimony, zinc, tin, lead, calcium, cobalt, lithium, combinations thereof, etc., heretofore utilized by those skilled in the art. The prior art, for example, discloses a great number of such catalysts, some of which are described in patents such as U.S. 2,465,319, U.S. 2,720,502, U.S. 2,727,881 and others. Specific catalysts heretofore known and which may be utilized include tetraisopropyl titanate, titanium dioxide, zinc acetate, zinc acetyl acetonate, lead oxide, calcium oxide, lithium ethoxide, antimony triacetate, antimony trioxide, manganese oxides and the like. Generally, the acetates, chlorides, nitrates, sulfates, oxides and alkoxides of one or more of the metals zinc, manganese, tin, lead, titanium, antimony, cobalt and lithium are preferred. For example the catalyst system of zinc acetate and tetraisopropyl titanate is well-suited to attain the desired reaction activity. The catalyst is generally utilized in a concentration of from about 0.002 percent to about 0.2 percent by weight of the reactants being condensed. Higher or lower percentages can also be employed. Generally, from about 0.001 percent to about 0.05 percent catalyst can be advantageously employed.

Reaction conditions are those which are normally used in the preparation of superpolyesters. For example, the temperature of the reaction may vary from about 125–350° C. from the initial ester exchange reaction through the final solid phase powder polymerization. Detailed aspects of the polyesterification process will be readily apparent to those having ordinary skill in this art since the preparation of polyesters such as poly (ethylene terephthalate) has been understood for a number of years and the literature and patented art are quite extensive in this regard.

The "inert gas" that can be utilized in the successful practice of the present invention is any of those gases that are not ordinarily reactive with the polymer under conventional polymer "melt" process conditions (i.e., at temperatures up to about 350° C. or more). This includes nonreactive materials that are gaseous under ambient conditions (1 atmosphere, and 25° C.), such as nitrogen, carbon dioxide, helium, argon, certain hydrocarbons, and certain halogenated hydrocarbons (having boiling points below the solidification temperature or melting point of the polymeric "melts"), as well as non-reactive materials (such as certain of the halogenated hydrocarbons, hydrocarbons, per se, and the like) that are not necessarily gaseous under ambient conditions, but which become gaseous at elevated temperatures and/or reduced pressures. Mixtures of "inert gases" can also be used, if desired.

Various means may be used for achieving the incoporation of the inert gas into the prepolymer. Thus, for example, the inert gas may be introduced by vortex action at the impeller of the reactor. Introduction of the inert gas at the impeller may be accomplished by an open-ended pipe, a perforated sparger ring, a porous stainless steel bubbler or by an eductor tube fastened to the shaft of the impeller which would suck the gas to a low pressure region near the impeller tip. Then while the gas bubbles are retained in a trapped, dispersed state through the prepolymer "melt," the "melt" is permitted to cool. Thus, the resulting solid product generally appears milky and opaque, and contains dispersed fairly uniformly therethrough, many distinct, generally spherical "holes," most of which still contain the "inert gas." While the "inert gas" (or mixture of "inert gases") that is chosen for use in the present processes will almost invariably be in the gaseous state at the time it is intermixed with the melted polymer, the successful practice of this invention does not require that this be so. For example, a material (such as a relatively higher boiling hydrocarbon or halogenated hydrocarbon) can be mixed into the polymer "melt" in an autoclave, under several atmospheres of pressure. Then, by releasing the pressure, a simultaneous cooling (of the polymer mass) and "gassifying" (of the higher boiling inert material) can be accomplished, with the net desired result that the "melt" solidifies and entraps the gassified material in sufficient volume and for a sufficient amount of time to impart the requisite amount of brittleness to the solidified material.

While perhaps the most important element, insofar as the successful practice of the present invention is concerned, is that the "inert gas" bubbles be present in practically all parts of the solidified prepolymer, another important factor that must be observed for optimum results is the use of enough "inert gas" to make the polymer "melt" (and solidified, opaque, bubble-filled polymer) occupy at least about 15 percent more volume than would the same amount of molten (or cooled) material when it does not contain the "inert gas" bubbles. Still further preferred, however, is the use of enough "inert gas" to "swell" the polymeric "melt" to at least 150% of its normal (ungassified) volume.

In an illustrative embodiment of this invention there is provided a process for preparing a linear superpolyester of at least one glycol and at least one dibasic acid comprising at least 50 mole percent of an acid having two carboxyl radicals attached to a carbocyclic nucleus having from 4 to 6 carbon atoms per ring, said superpolyester having a number average molecular weight of 15,000 to about 100,000, an inherent viscosity in a mixture of 60% phenol and 40% tetrachloroethane above at least about 0.50 and melting at from about 180° to about 350° C., comprising three phases as follows:

(1) Heating from about 1.05 to about 2.5 mole proportions or more of the glycol with one mole proportion of the dibasic acid in a form selected from the group consisting of the free acid, a lower alkyl (1 to 6 carbons) ester, anhydride and acid chloride, at subatmospheric pressures under conditions such that at first there is removed substantially all of any water, hydrogen chloride and alkanol corresponding to said forms of said dibasic acid and mostly subsequent thereto there is removed most of the excess of said glycol whereby an intermediate polyester prepolymer having an intrinsic viscosity of from about 0.4 to about 0.55 is obtained, bringing the pressure of the reaction vessel to atmospheric or greater with an inert gas and agitating the prepolymer melt contained in the reaction vessel in order to aerate same with the inert gas (high intensity agitation is generally required to whip enough gas into the melt) and entrain bubbles of the gas within the melt, and solidifying the melt by allowing it to cool (e.g. by casting) while maintaining the gas dispersed through the solidifying material;

(2) Comminuting said prepolymer to form solid particles substantially completely passing a 20 mesh screen with less than 25% passing a 200 mesh screen; and (3) In an enclosed polymerizing zone wherein at least 5% of the volume is occupied by said particles, heating at from 5° to 80° C. below the melting point of said prepolymer and between 175° and 300° C. in the presence of an inert gas at about atmospheric pressure which flows through said zone at from about 0.01 to about 100 ml. of inert gas per minute per gram of said particles, any of said particles more than 5 mm. from the surface being agitated into contact with said inert gas, whereby a substantially colorless superpolyester having an intrinsic viscosity of at least 0.6 and generally of at least about 0.7 is obtained, said intrinsic viscosity being at least 0.1 unit greater than for said prepolymer and usually 0.15 or more units greater. Phase 1 as set forth hereinabove can be conducted as a single operation or can be divided into two separate steps. In the latter case it is sometimes advantageous to perform the initial ester interchange between the glycol and the dibasic acid components in a batch reactor or in a column equipped with plates. Of course other apparatus can also be employed. The reactor or column is advantageously equipped with a reflux device such as packed column which returns to the reaction zone any of the glycol which might otherwise be lost during the ester interchange step. The lower alkanol is removed from the ester interchange zone. The second step of this first phase can then be accomplished advantageously by heating the ester interchange product in a batch reactor or some other suitable reaction vessel so as to remove a substantial proportion of the glycol in excess of that required to form a polyester. This step is normally advantageously accomplished under reduced pressure which facilitate the removal of the glycol, subsequent to which the reactor is pressurized, as described above, with inert gas.

The second phase of the described process, involving the comminuting of the prepolymer, can be accomplished in any convenient manner as long as the particles produced come within the size requirements set forth. According to one method the prepolymer can be cast as a sheet of the product of phase 1 and allowed to cool slowly whereby it can be broken into small pieces. These pieces can then be ground in any of the commonly available grinding machines so as to produce particles of the appropriate sizes. Usually the "aerated" prepolymer will have an intrinsic viscosity of no less than about 0.4 and preferably of from about 0.45 to about 0.55.

The powder build-up operation is conducted in an enclosed polymerizing zone wherein at least 5% of the volume is occupied by the particles. Such a zone can be a horizontal tube, upright cylinder or any other chamber through which inert gas can be conveniently moved across the surface of the particles.

There is no clear cut range of flow rates for the inert gas passing over the surface or through the prepolymer particles in the powder build-up operation since the effectiveness of the flowing gas depends to a considerable extent on the geometry of the polymerizing zone. However, it appears that a range of from about 0.001 to about 100 ml., and preferably from about 1 to about 50 ml., of inert gas per minute per gram of the solid particles covers about as much variation in flow rate as appears ordinarily practicable. An excessively high flow rate will obviously be economically wasteful since it will require employment of more heat in order to maintain the powder buildup conditions in the polymerizing range of temperatures.

The particles in the polymerizing zone can be advantageously heated at about from 5° to 80° C. below the melting point of the prepolymer. The most effective polymerization temperature depends upon the nature of the polyester and upon the type of catalyst employed. Generally the polymerization temperature is about 200–260° C. although higher and lower temperaures are operable such as 180–350° C.

Accoding to one method of preparing a superpolyester according to this invention, a prepolymer which has been treated with inert gas as described hereinabove is finely ground to form solid particles in the 40 to 70 mesh average size which are heated in a horizontal glass or metal tube at the polymerization temperature while a stream of dry nitrogen is passed through the tube and over the bed of polyester particles until the desired increase in the molecular weight of the polyester is obtained. The degree and rate of molecular weight buildup of the prepolymer is mainly dependent on the initial intrinsic viscosity of the prepolymer but is also somewhat dependent upon the particle size, the polymerization temperature, the rate of flow of the inert gas through or over the bed of prepolymer, the thickness of the bed of prepolymer, and the diameter of the reaction tube.

The particle size of the prepolymer is advantageously between 20 and 200 mesh (preferably an average size of from about 80 to about 100 mesh) although larger or smaller particles may be employed within the limits set forth above. Larger size particles require excessive amounts of fluidizing gas, tend to discolor, and slow down the rate of molecular weight buildup. The presence of a very high proportion of particles passing 200 mesh (such as 25% or more) is undesirable since such particles tend to be picked up by the moving gas and carried away.

One way for accomplishing the powder buildup is to conduct the polymerization in apparatus which maintains the solid particles in a fluidized condition. Such apparatus is well known in the cement making and in the powdered coal handling industries as well as elsewhere. For example, an upright cylindrical fluidized blender can be employed to suspend and agitate particles with hot inert gas while the walls of the blender are maintained at a temperature adequate to heat the particles to accomplish the polymerization. Additional prepolymer can be added to such a blender on a continuous basis and built-up particles can be removed as desired.

In cases where the polymerizing zone involves apparatus which fluidizes the particles, it is possible for the fluidized material to occupy a fairly major proportion of the total polymerizing zone. Theoretically, it could occupy almost the entire zone. The same would be true when other devices were being used for agitating the prepolymer particles and passing the inert gas through the agitated mass. In such cases much of the volume of the polymerization zone is filled with the gas used to fluidize the particles and such gas occupies the interstices between the particles.

The following examples will more clearly illustrate the process of the present invention although it is understood that the examples are not intended to be a limitation of the scope of the invention.

EXAMPLE 1

In pilot plant equipment, 120 lb. of dimethyl terephthalate, 66 lb. ethylene glycol, 65 p.p.m. zinc as zinc acetate dihydrate, and 230 p.p.m. antimony as antimony trioxide were reacted for 3.5 hours at atmospheric pressure to essentially complete the ester exchange reaction. The "monomer" melt was filtered and allowed to flow into the prepolymer reactor. After the excess ethylene glycol was removed at atmospheric pressure and the contents temperature was raised to 255° C., the pressure was gradually reduced during the next hour to less than one mm. Hg. The contents temperature was raised to 261° C. and the polymerization was continued for an additional 100 minutes. The vessel pressure was then returned to atmospheric with nitrogen gas and the contents were intensely agitated for an additional 15 minutes to "aerate" the prepolymer. The prepolymer melt was allowed to flow into a hopper and then through a pipe containing a section fitted with a stirrer and an inlet positioned adjacent the stirrer for injection into the "melt" of additional nitrogen gas. At this point, additional nitrogen gas is forced (under pressure) into the partially "aerated" prepolymer. In addition, more efficient, high intensity agitation is applied by the stirrer to effect a uniform distribution of all of the bubbles of gas in the molten prepolymer just before the "aerated" prepolymer is poured onto a moving stainless steel belt. This belt is operated under controlled conditions to give a brittle cake of fairly uniform thickness containing nitrogen bubbles dispersed fairly uniformly through the brittle cake that is readily ground in only 13 minutes.

Analysis:
Weight, lb. _____ 117
Intrinsic viscosity _____ 0.48
Melting point, ° C. _____ 257

EXAMPLE 2

In the manner described in Example 1, the prepolymer melt reaction was continued until the intrinsic viscosity of the polymer was above 0.45. The pressure of the reaction vessel was then brought to atmospheric with nitrogen. The contents were intensely agitated until the prepolymer melt contained many trapped bubbles. The melt was then cast, solidified and ground in the normal manner. The time of grinding was 13 minutes compared to the 20 minutes normally required for unaerated prepolymer with an intrinsic viscosity of only 0.38.

This prepolymer in pilot plant equipment polymerized to an intrinsic viscosity of 0.71 in two hours compared to four hours for a prepolymer of 0.39 to polymerize to 0.71.

EXAMPLE 3

In pilot plant vacuum reactor, 117 lb. of "aerated" prepolymer prepared as in Example 1 was heated in the absence of air to 215° C. using a jacket temperature of 232° C. When the powder temperature was 215° C., the jacket temperature was lowered to 215° C. and the pressure in the vessel was reduced to less than one mm. Hg. Average pressure for the batch was 190 microns. After two hours the pressure was raised with nitrogen to atmospheric to complete the powder polymerization reaction.

Analysis:
Weight, lb. _____ 118
Intrinsic viscosity _____ 0.71
Melting point, ° C. _____ 258

Accordingly, as shown in the above examples it has been found that, in accordance with this invention, "aeration" of a polymer melt with inert gas makes it more friable, allowing it to be ground more readily. As a result, it is possible to grind, at practical rates, and costs, prepolymers of much higher intrinsic viscosity than hitherto found possible. The resulting decrease in reaction cycle for powder polymerization makes this discovery especially valuable for the manufacture of polyesters such as poly(ethylene terephthalate) by powder polymerization, by gas or liquid flow at amospheric pressure or using vacuum techniques, but is equally applicable, as set forth hereinabove, to any polymer which is to be ground during processing. By the method of this invention, improved quality as well as an increase in the capacity of all equipment results from aerating the polymer. Such "gasification" results in greater brittleness and faster casting, breaking and grinding rates. Additionally, it reduces the time during which prepolymer must be held at casting temperature and also reduces prepolymer degradation and improves the reactivity of the prepolymer for solid phase polymerization. Further, since the solid phase reaction time is shortened, degradation during the solid phase reaction is reduced.

Although the invention has been described in considerable detail with reference to certain specific embodiments thereof, it will be understood that variations and modifications can be effected without departing from the spirit and scope of the invention as set forth in the specification and defined in the appended claims.

What is claimed is:

1. In a process for manufacturing a linear superpolyester having an intrinsic viscosity of at least about 0.5 and comprising repeating units of glycol and dibasic acid residues, which process comprises the steps of (a) initially preparing a molten prepolymer by a melt polymerization procedure;
(b) cooling to thereby solidify said molten prepolymer;
(c) grinding the resulting solidified prepolymer to thereby form prepolymer particles small enough to pass through a 20 mesh screen; and
(d) thereafter, in an enclosed polymerization zone and in the presence of an inert gas, heating said particles at a temperature of from about 5° to about 80° C. below the melting point of said particles to thereby increase the intrinsic viscosity of the polymer in said particles at least about 0.1 unit and produce said superpolyester;

the improvement which comprises (i) incorporating into said molten prepolymer, just prior to step (b), a multiplicity of bubbles of an inert gas, and (ii) then solidifying said prepolymer while maintaining said bubbles dispersed through said prepolymer to thereby form a solidified prepolymer having improved grinding properties; the intrinsic viscosity of said prepolymer being at least about 0.4.

2. A process as in claim 1, wherein said superpolyester is poly(ethylene terephthalate) and the amount of said inert gas maintained in said prepolymer during step (c) is at least about 15 volume percent of the unaerated volume of an equal weight of said prepolymer.

3. A process as in claim 2, wherein said inert gas is nitrogen.

4. A process as in claim 2, wherein said inert gas is carbon dioxide.

References Cited

UNITED STATES PATENTS

| | | | |
|---|---|---|---|
| 2,387,730 | 10/1945 | Alderson | 260—2.5 |
| 2,901,466 | 8/1959 | Kibler et al. | 260—75 |
| 3,051,993 | 9/1962 | Goldman et al. | 264—85 |
| 3,075,952 | 1/1963 | Coover et al. | 260—75 |
| 3,110,547 | 11/1963 | Emmert | 264—85 |
| 3,405,098 | 10/1968 | Heighton et al. | 260—75 |

ROBERT F. WHITE, Primary Examiner

J. R. THURLOW, Assistant Examiner

U.S. Cl. X.R.

260—2.5, 75; 264—85, 118, 144, 216